United States Patent [19]

Tokura et al.

[11] Patent Number: 4,981,767
[45] Date of Patent: Jan. 1, 1991

[54] PHOTOCONDUCTIVE MIXED CRYSTALS OF PHTHALOCYANINE COMPOUNDS AND PROCESS FOR PRODUCING THE SAME

[75] Inventors: Yoshinori Tokura, Tokyo; Shinichi Suzuki, Ibaraki; Junko Gouda, Ibaraki; Hideo Toda, Ibaraki; Akira Itsubo, Ibaraki; Tomoko Sasaki, Ibaraki, all of Japan

[73] Assignee: Mitsubishi Petrochemical Co., Ltd., Tokyo, Japan

[21] Appl. No.: 371,802

[22] Filed: Jun. 27, 1989

[30] Foreign Application Priority Data

Jun. 27, 1988 [JP] Japan ............................. 63-158632
Dec. 23, 1988 [JP] Japan ............................. 63-324981
Jan. 11, 1989 [JP] Japan ............................. 1-4451

[51] Int. Cl.$^5$ ............................................. G03G 5/06
[52] U.S. Cl. ........................................ 430/58; 430/78; 430/83
[58] Field of Search ..................... 430/58, 59, 78, 83

[56] References Cited

U.S. PATENT DOCUMENTS 3,816,118  6/1974  Byrne .............................. 430/78
4,755,443  7/1988  Suzuki et al. ..................... 430/59

FOREIGN PATENT DOCUMENTS 2145835  4/1985  United Kingdom .

OTHER PUBLICATIONS

Patent Abstracts of Japan, vol. 11, No. 319 (P-627)[2766], Oct. 17th, 1987; & JP-A-62 106 465 (Toray Ind. Inc.), 16-05-1987.
Patent Abstracts of Japan, vol. 10, No. 57 (P-434)[2114], Mar. 7th, 1986; & JP-A-60 210 348 (Toshiba K.K.), 11-10-1985.

Primary Examiner—John L. Goodrow
Attorney, Agent, or Firm—Oblon, Spivak, McClelland, Maier & Neustadt

[57] ABSTRACT

A photoconductive material comprising a mixed crystal of at least two phthalocyanine compounds whose central substances are different from each other, the phthalocyanine compounds being represented by formula (I):

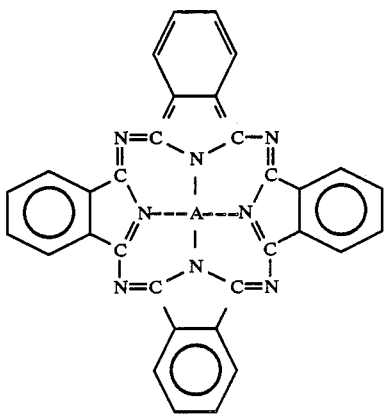

wherein A represents a substance capable of bonding to the phthalocyanine ligand through a covalent bond or a coordinate bond. The photoconductive material exhibits stability to heat and light and sufficient sensitivity in the visible to near infrared region.

12 Claims, 2 Drawing Sheets

PHOTOCONDUCTIVE MIXED CRYSTALS OF PHTHALOCYANINE COMPOUNDS AND PROCESS FOR PRODUCING THE SAME

FIELD OF THE INVENTION

This invention relates to an organic photoconductive material and a process for producing the same. More particularly, it relates to an organic photoconductive material containing phthalocyanine mixed crystals and having sensitivity in the visible to near infrared region.

BACKGROUND OF THE INVENTION

Photoconductive materials have been intensively studied and put into practical use as eletrophotographic photoreceptors, various sensors, and image pickup tubes. Known inorganic photoconductive materials include amorphous selenium, amorphous silicon, cadmium chloride, zinc oxide, and selenium-arsenic alloys. Known organic photoconductive materials include low-molecular materials such as carbazole, anthracene, pyrazolines, oxadiazoles, and hydrazones, and pigments or dyes such as phthalocyanine pigments, azo pigments, cyanine dyes, polycyclic quinone pigments, perylene pigments, and indigo dyes.

Electrophotographic photoreceptors so for widespread comprise a photosensitive layer consisting mainly of an inorganic photoconductive material, e.g., selenium, cadmium, and zinc oxide. These conventional inorganic photoconductive materials are not always satisfactory in sensitivity, heat resistance or printing durability.

Electrophotographic photoreceptors having a photosensitive layer consisting mainly of an organic photoconductive compound, on the other hand, have many advantages, such as relative facility in production, cheapness, non-polluting properties, and the ease on handling. In recent years, considerable attention has been devoted particularly to development of high performance organic photoreceptors in which a carrier generating function and a carrier transport function are respectively performed by different substances as described, e.g., in JP-A-60-67949 (the term "JP-A" as used herein means as "unexamined published Japanese patent application").

On the other hand, gas lasers, e.g., an Ar laser and an He-Ne laser, or semi-conductor lasers are regarded promising as a light source for the electrophotographic photoreceptor of copying machines possessing image processing functions, such as intelligent copying machines, and output printers of computers. Semi-conductor lasers, inter alia, have drawn attention because of the feasibility of reduction in size, weight, and cost. From the fact that the semi-conductor lasers are of lower output as compared with gas lasers and have oscillation wavelengths in the longer wavelength region of more than about 780 nm, some photoconductive compounds having sensitivity in the longer wavelength region have been proposed as disclosed in JP-A-60-19144 and JP-A-60-111248. However, the conventional organic photoconductive compounds, some of them having been turn into practical use, are not necessarily satisfactory in terms of sensitivity, residual potential, and stability on repeated use.

Further, because of the lower output of the semi-conductor lasers as compared with gas lasers and the longer oscillation wavelength (about 780 nm or more) of the semi-conductor lasers as stated above, spectral sensitivity exhibited by the conventional photoreceptors is in the shorter wavelength side. It has been thus demanded to develop a novel compound having high sensitivity in the longer wavelength region corresponding to the oscillation wavelength of the semiconductor lasers.

SUMMARY OF THE INVENTION

One object of this invention is to provide a novel organic photoconductive material having stability to heat and light and sufficient sensitivity in a long wavelength region (near infrared region).

This invention provides a photoconductive material having sensitivity in the visible to near infrared region, which comprises a mixed crystal of phthalocyanine compounds whose central substances are different, the phthalocyanine compounds being represented by formula (I):

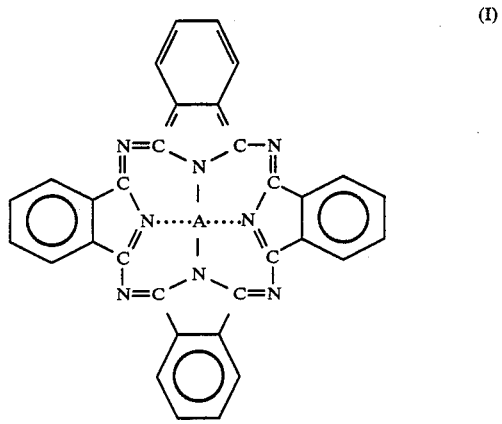

wherein A represents a substance capable of bonding to the phthalocyanine ligand through a covalent bond or coordinate bond.

This invention further provides a process for producing the above-described photoconductive material.

DETAILED DESCRIPTION OF THE INVENTION

Figure 1:
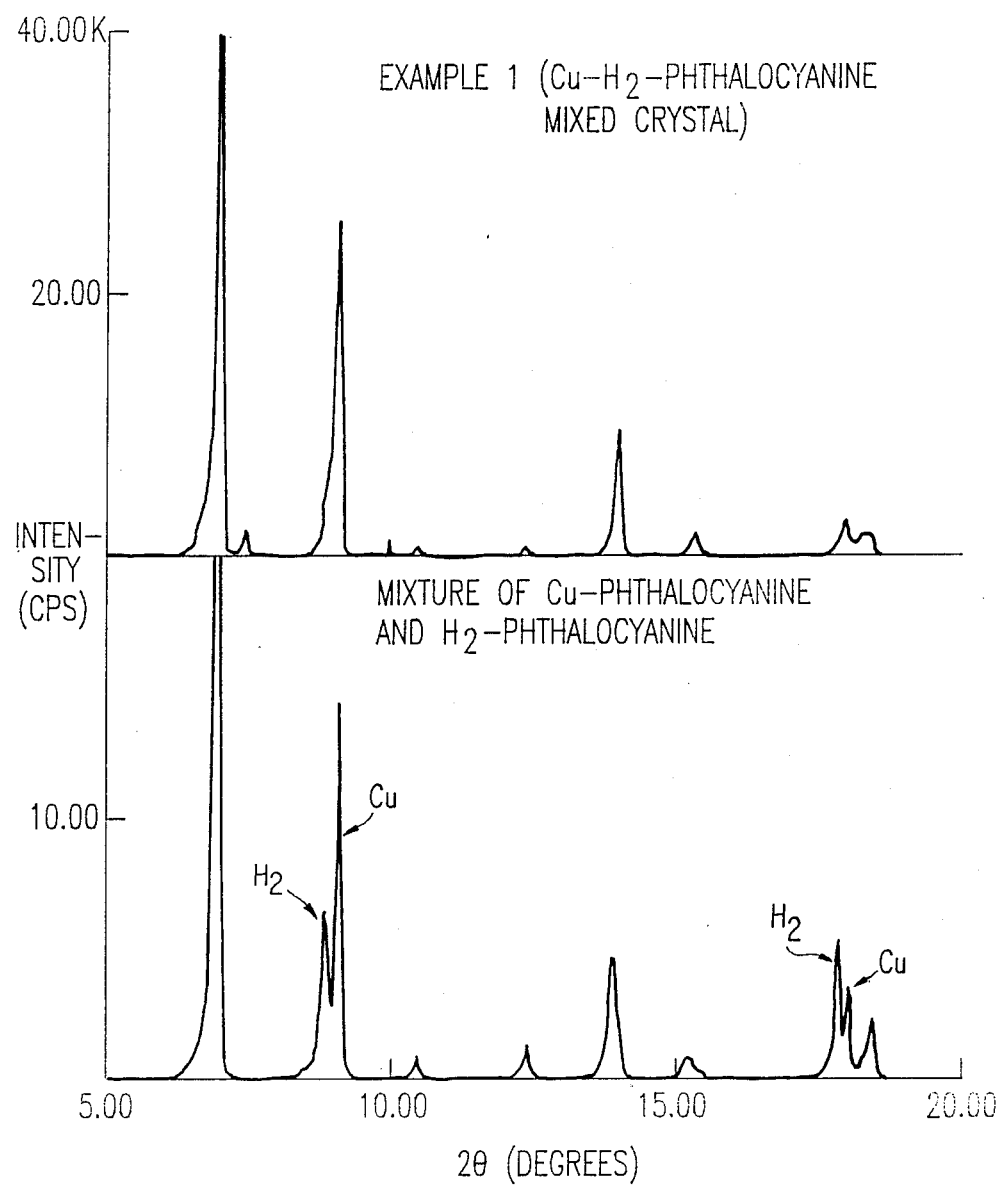
FIG. 1 is an X-ray diffraction pattern of each of the photoconductive material according to the present invention and the comparative mixture as obtained in Example 1.

The phthalocyanine compounds represented by formula (I) can be synthesized by known processes, such as the process described in G. T. Byrne, R. P. Linstead, and A. R. Lowe, *J. Chem. Soc.*, p1017 (1934).

In formula (I), the substance capable of covalently or coordinately bonding to the phthalocyanine ligand as represented by A is selected from simple substances of elements belonging to the groups IA, IIA, IIIA, IVA, VA, VIA, IB, IIB, IIIB, IVB, VB, VIB, VIIB and VIIIB in the long form of the periodic table, e.g., $H_2$, Li, Na, K, Cu, Ag, Au, Be, Mg, Ca, Ba, Zn, Cd, Hg, Al, Se, Y, In, Tl, Si, Ti, Ga, Zr, Sn, Hf, Pb, V, Nb, Sb, Ta, Cr, Mo, W, Mn, Te, Re, Fe, Co, Ni, Ru, Rh, Pd, Os, Ir, Pt, La, Ce, Pr, Nd, Pm, Sm, Eu, Gd, Tb, Dy, Ho, Er, Tm, Yb, Lu, Th, Pa, U, Np, Am, Ge, Bi and Ac, and compounds containing these elements, such as halides, oxides, and cyanides. Preferred of the phthalocyanine compounds are H$_2$-phthalocyanine, Cu-phthalocyanine, Fephthalocyanine, Co-phthalocyanine, Pb-phthalocyanine, Ni-phthalocyanine, VO-phthalocyanine, TiO-phthalocyanine, TiCl$_2$-phthalocyanine, GeCl$_2$-phthanlocyanine, and SnCl$_2$-phthalocyanine.

The photoconductive material according to the present invention comprises mixed crystals of two or more phthalocyanine compounds of formula (I) in which the respective central substances A are different. Taking a combination of two different kinds of phthalocyanine compounds as an instance, specific examples of such a combination include a combination of H$_2$-phthalocyanine the Cu-phthalocyanine, TiO-phthalocyanine or VO-phthalocyanine; a combination of Cu-phthalocyanine and TiO-phthalocyanine or VO-phthalocyanine; and a combination of TiO-phthalocyanine and VO-phthalocyanine. In these cases, a mixing ratio of the two phthalocyanine compounds is arbitrary. A molar ration of either one of them to the other of them usually ranges from 0.01 to 100, preferably from 0.1 to 10.0.

The mixed crystal to be used in the present invention can be obtained by vaporizing at least two different kinds of the phthalocyanine compounds either separately or simultaneously by heating at a temperature of at least the sublimation temperature of the compounds, preferably 450° to 500° C. under vacuum of not more than 1 Torr, preferably not more than 0.1 Torr, most preferably not more than $1 \times 10^{-4}$ Torr, in the respective or the same heating device and then reaggregating the vapors on a substrate set at a temperature not higher than the sublimation temperature, preferably 300° C. or lower.

The substrate to be used for re-aggregation includes metals, e.g., Al and Au, metal oxides, glass, and plastics in the form of a plate, a drum, a belt, etc., with metals, conductive metal oxides and conductive plastics being preferred because the substrate can be used as a conductive support as it is.

The phthalocyanine compounds are usually employed in the form of a powder. It is preferably to use a mixture previously prepared by dissolving two or more kinds of phthalocyanine compounds in a solvent and then reprecipitating the mixture in a poor solvent.

The heating device for sublimation in vacuo includes a vacuum evaporator and a sublimation furnace.

In place of heating, vaporization of the phthalocyanine compounds can also be effected by collision of accelerated particles against the phthalocyanine compounds. This can be done with a sputtering device.

The thus produced phthalocyanine mixed crystal in the form of a thin film on the substrate is usually used as a photoconductive material as such. It is also possible that the film is peeled off the substrate, powderized, and then processed to provide a photoconductive material.

The phthalocyanine mixed crystals can also be obtained by dissolving two or more kinds of phthalocyanine compounds in an appropriate solubilizing agent (solvent) and then precipitating the mixed crystal in a poor solvent. In this case, the molar ratio of the starting phthalocyanine compounds is not particularly limited. For example, in case of using two kinds of phthalocyanine compounds (P$_1$, P$_2$), a P$_1$/P$_2$ molar ratio usually ranges from 0.01 to 100, preferably from 0.1 to 10.0.

The kind and amount of the solubilizing agent to be used are not particularly limited as long as the two or more phthalocyanine compounds may be dissolved therein and they are not decomposed thereby. Specific examples of usable solubilizing agents are concentrated sulfuric acid, trifluoromethylsulfonic acid, and trichloromethylsulfonic acid. Usually, the solublilizing agent is used in an amount of from 5 to 100 ml, preferably from 20 to 60 ml, per gram of the phthalocyanine compounds. The phthalocyanine compounds may be dissolved in any mode, for example, at a temperature of from $-20°$ to 30° C., preferably from 0° to 20° C.

The poor solvent to be used is not particularly limited and includes, for example, water, dilute sulfuric acid, and organic solvents, e.g., methanol, ethanol, hexane, benzene, and toluene. The poor solvent is usually used in an amount of from 50 to 1,000 ml, preferably from 200 to 600 ml, per gram of the phthalocyanine compounds.

Precipitation of the phthalocyanine mixed crystal can generally be effected by pouring the phthalocyanine solution in the poor solvent or vise versa. The precipitation is not particularly limited in temperature or time and usually carried out at a temperature of from $-20°$ to 30° C., preferably from 0° to 10° C., for a period of from 1 to 3 hours. The thus formed precipitate is collected, washed, and dried to obtain the desired molecular mixture (mixed crystal).

The X-ray diffraction spectum of the resulting phthalocyanine mixed crystal shows a peak pattern different from that results from either of the starting phthalocyanine compounds. This means that the spacing of the mixed crystal differs from that of each starting phthalocyanine compounds, and that the mixed crystal is different from a mere mixture of the starting phthalocyanine compounds.

The thus obtained mixed crystal functions as a photoconductive material either alone or in combination with the starting phthalocyanine compounds.

It is possible to directly press mold the powdered phthalocyanine mixed crystals to obtain a photoconductive material, or it may be formed into a photoconductive material by finely grinding the powdered phthalocyanine mixed crystal by means of a ball mill, etc., dispersing the resulting fine particles in an appropriate solvent, dissolving, if desired, a binder resin in the dispersion, and coating the resulting dispersion on a substrate, followed by drying. Any kind of resins can be used as the binder resin, but insulating film-forming high polymers are preferred. Such polymers include polycarbonate, polyester, methacrylic resins, acrylic resins, polyvinyl chloride, polyvinylidene chloride, polystyrene, polyvinyl acetate, styrene-butadiene copolymers, vinylidene chlorideacrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, poly-N-vinylcarbazole, and polyvinyl butyral.

The electrophototgraphic photoreceptor comprising the photoconductive material according to the present invention comprises a conductive support having provided thereon a photosensitive layer containing at least one of the above-described phthalocyanine mixed crystals as a carrier generating substance. The electrophotographic photoreceptor may have any known structural embodiment. For example, the photosensitive layer may be composed of a carrier generating layer consisting mainly of the phthalocyanine mixed crystal of the present invention and a carrier transport layer consisting mainly of a carrier transporting substance, or the photosensitive layer may be a single layer containing the carrier transporting substance having dispersed therein the carrier generating substance. The photosensitive layer may be provided on the support either directly or via an intermediate layer. In this connection, various structural embodiments as disclosed in JP-A-60-67949 are applicable.

The conductive support to be used in the photoreceptor includes metallic plates, metallic drums, and composite support composed of a substrate, e.g., paper, plastics, and film, on which a conductive thin layer comprising a conductive compound (e.g., conductive polymers, and indium oxide) or a metal (e.g., aluminum, palladium, and gold) is provided by coating, vacuum deposition, laminating, and the like technique.

The coating composition for forming a carrier generating layer can be prepared by finely grinding the phthalocyanine mixed crystal by means of a ball mill, etc. and dispersing the fine particles in an appropriate solvent, dissolving, if desired, a binder resin in the dispersion. The coating composition is coated on the conductive support either directly or via an intermediate layer or on a previously formed carrier transport layer, followed by drying to thereby form a carrier generating layer. The fine particles of the phthalocyanine mixed crystal usually have a particle diameter of 5 $\mu$m or less, preferably 1 $\mu$m or less. The carrier generating layer has a thickness of from 0.01 to 20 $\mu$m, preferably from 0.05 to 5 $\mu$m. The carrier generating layer contains from 10 to 100%, preferably from 30 to 95%, by weight of the phthalocyanine mixed crystal.

The carrier generating layer may also be formed on a substrate by vacuum evaporation or sputtering to a film thickness of from 10 Å to 10 $\mu$m, preferably from 100 Å to 1 $\mu$m. In the case of using the mixed crystal in a gaseous phase, the process may be simplified by the use of a conductive support as a substrate.

The carrier transport layer can be formed by coating a carrier transporting substance dissolved in an appropriate medium and drying. The carrier transporting substance includes, for example, electron accepting substances, e.g., trinitrofluorenone and tetranitrofluorenone, polymers having a heterocyclic compound in the side chain, e.g., poly-N-vinylcarbazole, and positive hole-transporting electron donating substances, e.g., triazole derivatives, oxadiazole derivatives, imidazole derivatives, pyrazoline derivatives, polyarylalkane derivatives, phenylenediamine derivatives, hydrazone derivatives, amino-substituted chalcone derivatives, triarylamine derivatives, carbazole derivatives, and stilbene derivatives.

The carrier transport layer has a film thickness of from 1 to 100 $\mu$m, preferably from 5 to 50 $\mu$m.

Binders which can be used, if desired, in the formation of the carrier generating layer or carrier transport layer are arbitrary. In particular, the above-described insulating film-forming high polymers are preferred as a binder.

The disperse single layer system combining the function of a carrier-generating layer and the function of a carrier-transport layer can be formed by coating the above-described dispersion for a carrier generating layer having dissolved or dispersed therein the carrier transporting substance on a conductive support either directly or via an intermediate layer.

Any other known techniques can be used for the production of the electrophotographic photoreceptor.

For example, the photosensitive layer may contain a third component, such as a sensitizer. Suitable sensitizers include Lewis acids capable of forming a charge transfer complex with an organic photoconductive substance and dyestuffs. The photosensitive layer may further contain a plasticizer for improving film-formability, flexibility and mechanical strength.

The photoconductive material according to the present invention functions as a charge generating substance for an infrared sensor or an electrophotographic photoreceptor, exhibiting sufficient sensitivity to longer wavelength light sources, such as semiconductor lasers and is therefore widely applicable in the field of electrophotography including laser printers and laser facsimiles.

The present invention is now illustrated in greater detail with reference to the following Examples and Comparative Examples, but it should be understood that the present invention is not deemed to be limited thereto.

EXAMPLE 1

Cu-Phthalocyanine (100 mg) and $H_2$-phthalocyanine (100 mg) were separately put in each of two tungsten boats in a bell jar, and the bell jar was evacuated to a degree of vacuum of $2 \times 10^{-5}$ Torr. Each evaporation source was heated to about 450° C. and, after controlling the rate of deposition constant at 200 Å/min (as measured with a film thickness monitor), the shutter was opened to thereby deposit Cu-phthalocyanine and $H_2$-phthalocyanine on an aluminum substrate set at room temperature to a deposite thickness of 2000 Å for over a period of about 10 minutes.

The deposited film was peeled off the substrate and analyzed by X-ray diffractometry. The diffraction pattern is shown in FIG. 1. For comparison, an X-ray diffraction pattern of a mere mixture of a Cu-phthalocyanine powder and an $H_2$-phthalocyanine powder obtained by mixing in an agate-made moartar is also shown in FIG. 1. It can be seen from FIG. 1 that the film of the example comprised of a mixed crystal in which the two kinds of phthalocyanine compounds were mixed in the molecular state. The diffraction angle of the main peak of the mixed crystal was found to be 6.78°.

COMPARATIVE EXAMPLE 1

A deposited film was prepared in the same manner as in Example 1, except that Cu-phthalocyanine alone was vacuum evaporated by means of an ordinary vacuum evaporator. The X-ray diffraction pattern of the resulting deposited film exhibited a main peak diffraction angle of 6.82°.

COMPARATIVE EXAMPLE 2

A deposited film was prepared in the same manner as in Comparative example 1, except for using $H_2$-phthalocyanine in place of Cu-phthalocyanine. The main peak of the X-ray diffraction pattarn had a diffraction angle of 6.72°.

EXAMPLE 2

A deposited film was prepared in the same manner as in Example 1, except for using TiO-phthalocyanine in place of $H_2$-phthalocyanine.

EXAMPLE 3

In 50 ml of sulfuric acid were dissolved 1.8 mmol of Cu-phthalocyanine and 1.8 mmol of $H_2$-phthalocyanine. After any insoluble matter was removed by filtration, the filtrate was poured into 600 ml of water to cause re-precipitation. The resulting powder was thoroughly washed with a large quantities of water and ethanol and dried in vacuo at 70° C. to obtain a molecular mixture.

A hundred milligrams of the resulting molecular mixture in a tungsten boad was evaporated by heating in an ordinary vacuum evaporation apparatus under vacuum of $2 \times 10^{-5}$ Torr at a sublimation temperature of the molecular mixture (about 450° C.) to thereby deposit the mixture on an aluminum plate set at room temperature to a thickness of 2000 Å. The main peak of the X-ray diffraction pattern had a diffraction angle of 6.74°.

EXAMPLE 4

A deposited film was prepared in the same manner as in Example 3, except for changing the amounts of Cu-phthalocyanine and $H_2$-phthalocyanine to 0.9 mmol and 2.7 mmol, respectively. The main peak of the X-ray diffraction pattern had a diffraction angle of 6.7°.

EXAMPLE 5

A deposited film was prepared in the same manner as in Example 3, except for changing the amounts of Cu-phthalocyanine and $H_2$-phthalocyanine to 2.7 mmol and 0.9 mmol, respectively. The main peak of the X-ray diffraction pattern had a diffraction angle of 6.77°.

COMPARATIVE EXAMPLE 3

A deposited film was prepared in the same manner as in Example 3, except for using Cu-phthalocyanine alone in an amount of 3.6 mmol. The main peak of the X-ray diffraction pattern had a diffraction angle of 6.68°.

COMPARATIVE EXAMPLE 4

A deposited film was prepared in the same manner as in Example 3, except for using $H_2$-phthalocyanine alone in an amount of 3.6 mmol. The main peak of the X-ray diffraction pattern had a diffraction angle of 6.78°.

From these results, it can be seen that the main peak of the X-ray diffraction pattern of the mixed crystal according to the present invention is in the midway between the main peak diffraction angles of each of the simple substances constituting the mixed crystal, thus having a different spacing from that of the simple substances.

EXAMPLE 6

A deposited film was prepared in the same manner as in Example 3, except for using 1.8 mmol of Cu-phthalocyanine and 1.8 mmol of TiO-phthalocyanine.

EXAMPLE 7

A deposited film was prepared in the same manner as in Example 1, except for using TiO-phthalocyanine in place of Cu-phthalocyanine. The X-ray diffraction pattern of the film having been peeled off the substrate is shown in FIG. 2.

Figure 2:
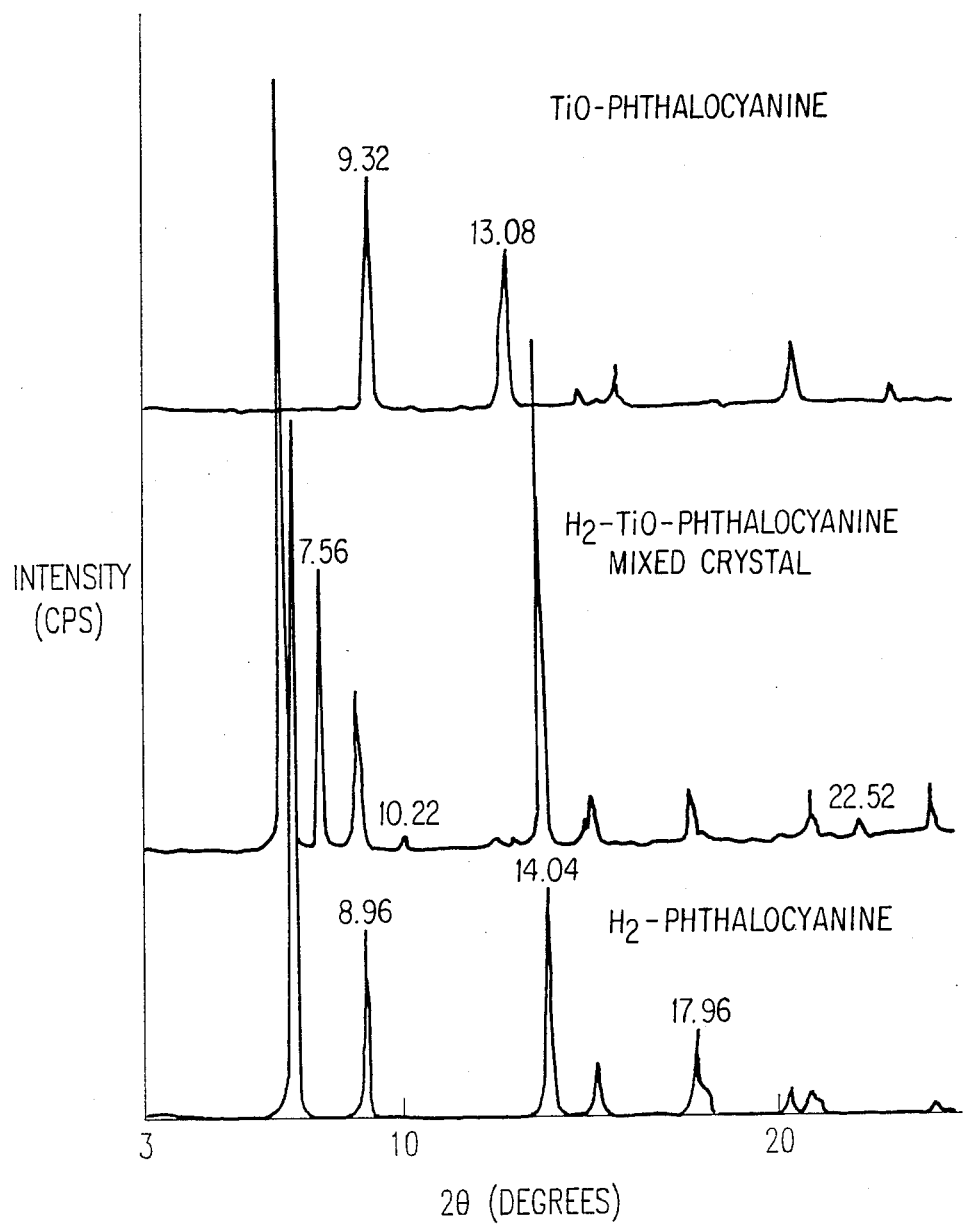
FIG. 2 is an X-ray diffraction pattern of each of the photoconductive material according to the present invention and each of the starting materials thereof as obtained in Example 7.

For comparison, the X-ray diffraction pattern of a deposited film obtained from each of TiO-phthalocyanine and $H_2$-phthalocyanine alone by the use of an ordinary vacuum evaporation apparatus is also shown in FIG. 2.

In FIG. 2, the film prepared by the method of the present invention exhibited new peaks at 7.56°, 10.22°, and 22.52° in addition to the peaks assigned to each of the two kinds of phthalocyanine compounds. It can thus be proved that the film of this example comprises one kind of crystal in which the two kinds of phthalocyanine compounds are mixed in a molecular state.

COMPARATIVE EXAMPLE 5

A deposited film was prepared in the same manner as in Example 1, except that TiO-phthalocyanine alone was vacuum evaporated by the use of an ordinary vacuum evaporation apparatus. The main peaks of the X-ray diffraction pattern of the film had a diffraction angle of 9.32° and 13.08°.

APPLICATION EXAMPLE 1

On each of the deposited film on an aluminum plate as prepared in Examples 1 to 7 and Comparative Examples 1 to 5 was coated a solution consisting of 200 mg of p-diethylaminobenzaldehyde diphenylhydrazone and 200 mg of a polycarbonate resin "Iupilon E-2000" produced by Mitsubishi Gas Chemical Industries Ltd., and 2.5 ml of tetrahydrofuran to a dry thickness of 15 μm, followed by drying to obtain an electrophotographic photoreceptor.

The resulting photoreceptors were evaluated for electrophotographic characteristics according to the following test method. The results obtained are shown in Table 1 below.

Test Method:

The photoreceptor was statically charged by corona discharge to −6 kV and, after allowing to stand in dark for 10 seconds, the initial surface potential was measured. The photoreceptor was then exposed to monochromatic light of 800 nm which was isolated from light emitted from a xenone lamp by means of a monochrometer, and the time (second) required for the surface potential to decrease to half was measured to obtain an exposure amount ($\mu J/cm^2$).

TABLE 1

| Photo-receptor | Initial Surface Potential (V) | Exposure Amount at 800 nm ($\mu J/cm^2$) |
| --- | --- | --- |
| Example 1 | 1080 | 1.4 |
| Example 2 | 1170 | 1.2 |
| Example 3 | 1065 | 1.2 |
| Example 4 | 1200 | 1.9 |
| Example 5 | 1095 | 2.1 |
| Example 6 | 1110 | 1.1 |
| Example 7 | 1070 | 0.9 |
| Comparative Example 1 | 1110 | 19.6 |
| Comparative Example 2 | 1140 | 11.2 |
| Comparative Example 3 | 1075 | 18.5 |
| Comparative Example 4 | 1060 | 10.3 |
| Comparative Example 5 | 1100 | 2.5 |

In 50 ml of sulfuric acid were dissolved 1.8 mmol of Cu-phthalocyanine and 1.8 mmol of TiO-phthalocyanine. After any insoluble matter was removed by filtration, the filtrate was poured into 600 ml of water to cause re-precipitation. The resulting powder was thoroughly washed with a large quantities of water and ethanol and dried in vacuo at 70° C. to obtain a molecular mixture.

Fifty milligrams of the resulting phthalocyanine mixed crystal and 50 ml of a polycarbonate resin "Iupilon E-2000" were added 2.5 ml of tetrahydrofuran, and the mixture was dispersed in a ball mill for 12 hours. The dispersion was coated on an aluminum plate to a dry thickness of 1 μm to form a carrier generating layer.

A solution consisting of 200 mg of p-diethylaminobenzaldehyde diphenylhydrazone, 200 mg of a polycarbonate resin "Iupilon E-2000", and 2.5 ml of tetrahydrofuran was coated on the carrier generating layer to a dry thickness of 15 μm to form a carrier transport layer.

The thus produced electrophotographic photoreceptor was evaluated in the same manner as in Application Example 1. As a result, the initial surface potential was 970 V, and the exposure amount at 800 nm was 1.6 μJ/cm$^2$.

APPLICATION EXAMPLE 2

An electrophotographic photoreceptor was produced in the same manner as in Application Example 1, except for using 200 mg of 2,5-bis(p-diethylaminophenyl)-1,3,4-oxadiazole as a carrier transporting substance in place of p-diethylaminobenzaldehyde diphenylhydrazone. The photoreceptor was evaluated in the same manner as in Application Example 1. As a result, the initial surface potential was 1065 V and the exposure amount at 800 nm was 1.4 μJ/cm$^2$.

While the invention has been described in detail and with reference to specific embodiments thereof, it will be apparent to one skilled in the art that various changes and modifications can be made therein without departing from the spirit and scope thereof.

What is claimed is:

1. A photoconductive material comprising a mixed crystal of at least two phthalocyanine compounds whose central substances are different from each other, the phthalocyanine compounds being represented by formula (I):

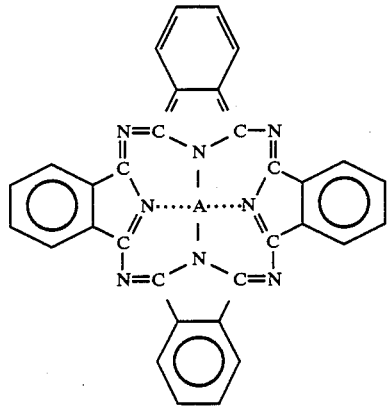

(I)

wherein A represents a substance capable of bonding to the phthalocyanine ligand through a covalent bond or a coordinate bond.

2. A photoconductive material as claimed in claim 1, wherein said central substance as represented A is selected from simple substances of elements belonging to the groups IA, IIA, IIIA, IVA, VA, VIA, IB, IIB, IIIB, IVB, VB, VIB, VIIB, and VIIIB, e.g., H$_2$, Li, Na, K, Cu, Ag, Au, Be, Mg, Ca, Ba, Zn, Cd, Hg, Al, Se, Y, In, Tl, Si, Ti, Ga, Zr, Sn, Hf, Pb, V, Nb, Sb, Ta, Cr, Mo, W, Mn, Te, Re, Fe, Co, Ni, Ru, Rh, Pd, Os, Ir, Pt, La, Ce, Pr, Nd, Pm, Sm, Eu, Gd, Tb, Dy, Ho, Er, Tm, Yb, Lu, Th, Pa, U, Np, Am, Ge, Bi, and Ac, and compounds containing these elements.

3. A photoconductive material as claimed in claim 1, wherein said phthalocyanine compounds whose central substances are different from each other are two compounds selected from a combination of H$_2$-phthalocyanine and Cu-phthalocyanine, TiO-phthalocyanine or VO-phthalocyanine; a combination of Cu-phthalocyanine and TiO-phthalocyanine or VO-phthalocyanine; and a combination of TiO-phthalocyanine and VO-phthalocyanine.

4. A photoconductive material as claimed in claim 3, wherein a molar ratio of either one of said two compounds to the other of them ranges from 0.01 to 100.

5. A process for producing a photoconductive material comprising a mixed crystal of at least two phthalocyanine compounds whose central substances are different from each other, the phthalocyanine compounds being represented by formula (I):

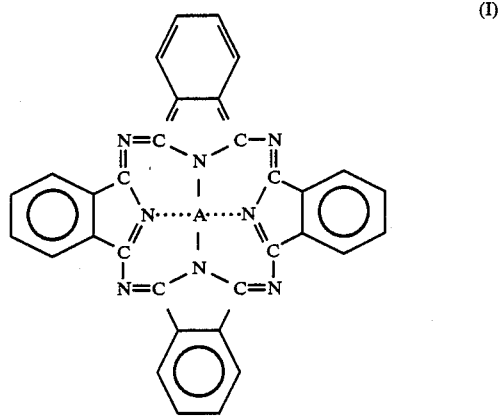

(I)

wherein A represents a substance capable of bonding to the phthalocyanine ligand through a covalent bond or coordinate bond, which comprises vaporizing said at least two phthalocyanine compounds and re-aggregating the vapors on a substrate.

6. A process as claimed in claim 5, wherein said vaporizing is by heating at a temperature not lower than the sublimation temperature of the phthalocyanine compounds under vacuum of not more than 1 Torr and said substrate is set at a temperature not higher than the sublimation temperature.

7. A process as claimed in claim 5, wherein said vaporizing is by collision of accelerated particles against the phthalocyanine compounds.

8. A process for producing a photoconductive material comprising a mixed crystal of at least two phthalocyanine compounds whose central substances are different from each other, the phthalocyanine compounds being represented by formula (I):

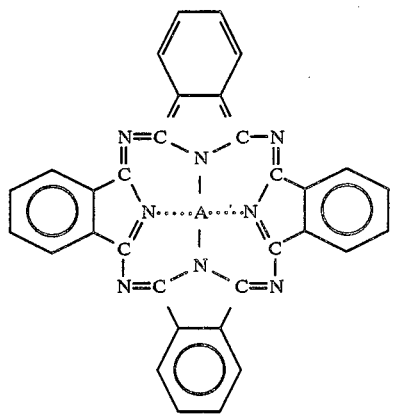

(I)

wherein A represents a substance capable of bonding to the phthalocyanine ligand through a covalent bond or a coordinate bond, which comprises dissolving said at least two phthalocyanine compounds in a common solubilizing agent and precipitating the mixed crystal in a poor solvent.

9. A process as claimed in claim 8, wherein said common solubilizing agent is selected from concentrated sulfuric acid, trifluoromethylsulfonic acid, and trichloromethylsulfonic acid.

10. A process as claimed in claim 8, wherein said poor solvent is selected from water, dilute sulfuric acid, methanol, ethanol, hexane, benzene, and toluene.

11. An electrophotographic photoreceptor comprising a conductive support having provided thereon a photosensitive layer containing, as a carrier generating substance, at least one mixed crystal of at least two phthalocyanine compounds whose central substances are different from each other, the phthalocyanine compounds being represented by formula (I):

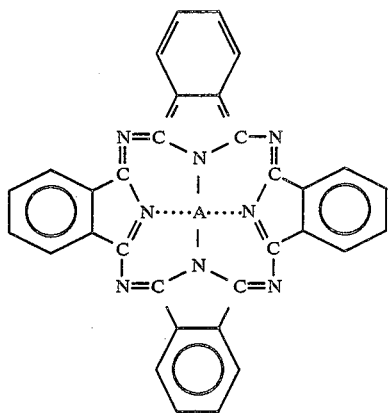

(I)

wherein A represents a substance capable of bonding to the phthalocyanine ligand through a covalent bond or a coordinate bond.

12. An electrophotographic photoreceptor as claimed in claim 11, wherein said photosensitive layer further contains a carrier transporting substance.

* * * * *